United States Patent [19]

Jeavons

[11] 4,102,588
[45] Jul. 25, 1978

[54] PIVOT MOUNTING OF LEVERS

[75] Inventor: Philip Swingewood Jeavons, Birmingham, England

[73] Assignee: Wilmot-Breeden Limited, Birmingham, England

[21] Appl. No.: 724,066

[22] Filed: Sep. 16, 1976

[30] Foreign Application Priority Data

Sep. 16, 1975 [GB] United Kingdom ............... 37907/75

[51] Int. Cl.² .............................................. F16B 9/00
[52] U.S. Cl. ...................................... 403/245; 403/361
[58] Field of Search ............... 403/243, 244, 245, 246, 403/247, 252, 254, 263, 361, 375, 383

[56] References Cited

U.S. PATENT DOCUMENTS

| 2,678,227 | 5/1954 | Niemeyer et al. ............... 403/247 |
| 3,187,363 | 6/1965 | Auwarter ........................ 403/375 X |
| 3,399,911 | 9/1968 | Reisch ............................ 403/383 X |
| 3,415,472 | 12/1968 | Vodinh ........................... 403/361 X |

Primary Examiner—Wayne L. Shedd
Attorney, Agent, or Firm—Young & Thompson

[57] ABSTRACT

A moulded plastics lever is formed with a butterfly-shaped aperture part of the periphery of which is bounded by integral, resilient locating formations. The lever is mounted on a metal support element having a pressed-out tag formed with a reduced width neck portion engaged by the locating formations to hold the lever and the support element together.

3 Claims, 5 Drawing Figures

PIVOT MOUNTING OF LEVERS

This invention relates to methods and means for the pivotal mounting of levers and, although the invention has been developed in relation to the mounting of an operating lever of a motor vehicle door latch, the invention is not limited to vehicle component applications.

According to the invention the lever has an aperture which receives a fixed blade projecting from a support plate, the aperture consisting of two segments of a circle which are disposed in overlapping relationship with their medial axes in alignment. The central portions of two opposed sides of the aperture are spaced apart a distance less than the spacing between the end portions of the said sides of the aperture and the curvate boundary edge portions of the segments, which interconnect said end portions, include resilient locating formations. The blade projecting from the support plate is of generally rectangular form in elevation and has a reduced width neck portion which is arranged for snap-engagement with the resilient locating formations.

The plastics material from which the lever is molded may be a comparatively rigid material such as a polyacetal resin or nylon. As mentioned above, the invention has been developed in relation to operating mechanisms for motor vehicle door latches and thus the lever may be a release lever, a blocking lever or an operating lever of the latch whilst the metal support element is preferably a cover plate forming part of the latch casing. An important advantage of the invention is that it avoids the requirement for a separate component, such as a rivet, for attaching the lever to the support element.

An embodiment of the invention will now be described by way of example with reference to the accompanying drawings, in which:

FIG. 1 is a plan view of an operating lever of a motor vehicle door latch,

FIG. 2. is a sectional view along the line A—A of FIG. 1,

Figure 1:
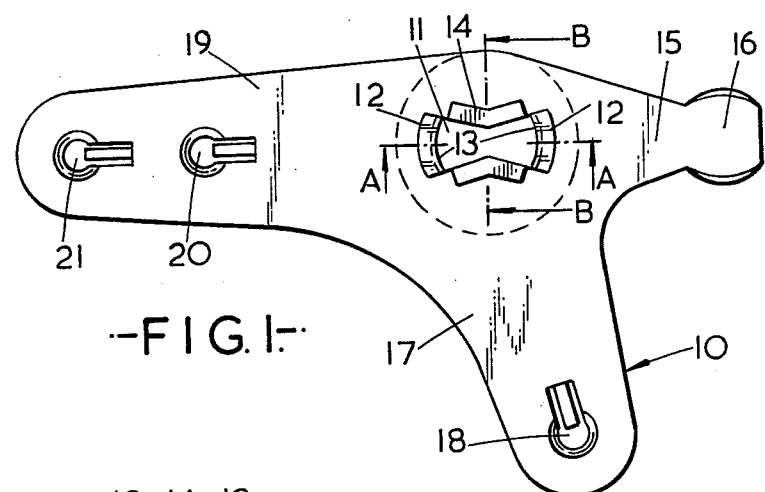
Figure 2:
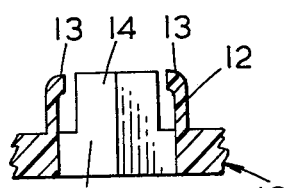
Figure 3:
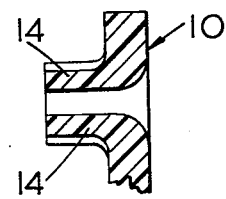
FIG. 3 is a sectional view along the line B—B of FIG. 1.

As shown in FIG. 1, the lever 10 is formed with an aperture 11 which consists of two segments of a circle which are disposed in overlapping relationship and with their medial axes in alignment (as can be seen from FIG. 1). The aperture 11 can thus be considered to be of generally butterfly shape and the curvate boundary edges of this aperture are defined by resilient locating formations 12 moulded integrally with the lever 10 and terminating at their free ends in inwardly directed lips 13. The other edges of the aperture 11 are bounded by reinforcing ribs 14 but, as can be seen from FIGS. 1 and 2, the ribs 14 are separate from the formations 12 and in no way hinder resilient deflection of the formations 12.

The lever 10 is a three-armed lever with the aperture 11 provided at the junction between the three arms. One arm 15 terminates in a shaped end portion 16 adapted for connection to another component of the latch; a second arm 17 has an aperture 18 to receive the cranked end portion of an operating rod (not shown); and the third arm 19 has two apertures 20 and 21 each capable of receiving the cranked portion of an operating rod. Each of the apertures 18, 20 and 21 includes an integral projecting fin extending into the aperture (as described in detail in co-pending Application No. 37908/75) for engagement with the rod for anti-rattle purposes.

Figure 4:
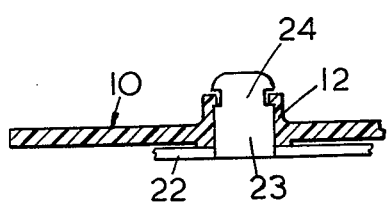
FIG. 4 is a view showing the lever in engagement with a tag of a latch cover plate.
Figure 5:
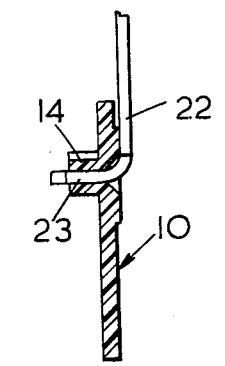
FIG. 5 is a view of the latch and tag in a direction at right angles to FIG. 4.

Referring next to FIGS. 4 and 5, these show a metal support element 22 (in particular a latch cover plate) which is formed with a pressed-out tag 23. The tag 23 is of rectangular form and is formed with radiussed corners at its free end. A short distance from said free end, a reduced width neck portion 24 is provided and the arrangement is such that, during assembly of the lever 10 and the latch cover plate, the tag 23 is caused to enter the aperture 11 and the lips 13 are moved apart by the free end of the tag. They then move resiliently inwardly upon continued relative movement between the cover plate and the lever 10 and snap into the recesses afforded by the neck portion 24. As can be seen from FIGS. 4 and 5, the distance between the sides 25 of the tag is substantially equal to the distance between the inner surfaces of the locating formations 12 in the relaxed or undeformed state thereof. In addition, the thickness of the plate from which the support element 22 is formed is substantially equal to the distance between the central portions of the ribs 14 which extend along the straight edges of the aperture 11 and form stops limiting the extent of pivotal movement of the lever 10 relative to the support element 22. Thus, when the tag 23 is fitted in the aperture 11, predetermined relative angular movement between the lever 10 and support element 22 is permitted, the particular construction shown providing for movement of the lever 10 through 30° between its two limiting positions.

During pivotal movement of the lever 10, the lips 13 of the resilient formations remain in engagement with the neck portion 24 of the tag 23 and hold the lever 10 in face-to-face engagement with the support element 22.

What we claim is:

1. The combination of a plastics lever and a metal support plate relative to which the lever is pivotable between first and second limiting positions; said lever having an aperture which receives a fixed blade projecting from the support plate and the blade being of rectangular form in elevation and including a reduced width neck portion intermediate its ends; the aperture consisting of two segments of a circle which are disposed in overlapping relationship with their medial axes in alignment and the central portions of two opposed sides of the segments being spaced apart a distance less than the spacing between the end portions of said sides of the aperture and the curvate boundary edge portions of the segments, which interconnect said end portions, including resilient locating formations which have snap-engagement with the reduced width neck portion of the blade.

2. The combination according to claim 1, wherein the resilient locating formations which have said snap-engagement with the blade comprise walls upstanding from the plane of the lever and terminating in inwardly directed lips which engage the reduced width neck portion.

3. The combination according to claim 1, wherein reinforcing ribs extend along said two opposed sides of the segments.

* * * * *